United States Patent [19]

Iwata et al.

[11] Patent Number: 5,230,046
[45] Date of Patent: Jul. 20, 1993

[54] SYSTEM FOR INDEPENDENTLY CONTROLLING SUPPLY OF A CLOCK SIGNAL TO A SELECTED GROUP OF THE ARITHMETIC PROCESSORS CONNECTED IN SERIES

[75] Inventors: Jun Iwata, Tokyo; Hiroyuki Kasai, Yamanashi, both of Japan

[73] Assignee: NEC Corporation, Tokyo, Japan

[21] Appl. No.: 419,274

[22] Filed: Oct. 10, 1989

[30] Foreign Application Priority Data

Oct. 8, 1988 [JP] Japan .................. 63-252901

[51] Int. Cl.$^5$ ............................................. G06F 11/00
[52] U.S. Cl. ..................... 395/575; 364/267.7; 364/266.1; 364/271.6; 364/268.9; 364/DIG. 1; 371/14
[58] Field of Search ................ 395/550, 575, 750

[56] References Cited

U.S. PATENT DOCUMENTS

| | | | |
|---|---|---|---|
| 3,229,251 | 1/1966 | Homan et al. | 340/146.1 |
| 3,245,048 | 4/1966 | Carter et al. | 340/172.5 |
| 3,248,707 | 4/1966 | Paul et al. | 340/172.5 |
| 3,702,463 | 11/1972 | Lesniewski | 340/172.5 |
| 3,810,121 | 5/1974 | Chang | 395/325 |
| 4,447,870 | 5/1984 | Tague | 395/550 |
| 4,462,072 | 7/1984 | Tague | 395/550 |
| 4,545,030 | 1/1985 | Kitchin | 395/550 |
| 4,783,783 | 11/1988 | Nagai et al. | 371/12 |
| 4,851,987 | 7/1989 | Day | 395/550 |
| 4,916,697 | 4/1990 | Roche | 371/14 |
| 4,937,741 | 6/1990 | Harper | 395/550 |
| 5,021,950 | 6/1991 | Nishikawa | 395/550 |

FOREIGN PATENT DOCUMENTS 0257952 3/1988 European Pat. Off.

Primary Examiner—Thomas C. Lee
Assistant Examiner—Eric Coleman
Attorney, Agent, or Firm—Foley & Lardner

[57] ABSTRACT

In a computer system comprising first through K-th arithmetic processors connected to a control section (18) in an ascending order, where K represents a positive integer which is not less than two, a memorizing unit (20) memorizes first and second information. A clock controlling unit (21) detects a fault signal produced by a k-th arithmetic processor, where k represents one of 1 through K. When the memorizing unit memorizes the first information, the controlling unit controls a supplying unit (19) to put the k-th through the K-th arithmetic processors out of operation. When the memorizing unit memorizes the second information, the controlling unit controls the supplying unit to put the first through the K-th arithmetic processors out of operation even upon production of the fault signal by any one of the first through the K-th arithmetic processors. Besides a first group of the first through the K-th arithmetic processors, a second group may be included in the computer system to comprise an additional arithmetic processor connected to the control section. When the memorizing unit memorizes the first information, the additional arithmetic processor is kept in operation. When the memorizing unit memorizes the second information, the additional arithmetic processor is put out of operation.

6 Claims, 1 Drawing Sheet

SYSTEM FOR INDEPENDENTLY CONTROLLING SUPPLY OF A CLOCK SIGNAL TO A SELECTED GROUP OF THE ARITHMETIC PROCESSORS CONNECTED IN SERIES

BACKGROUND OF THE INVENTION

This invention relates to a computer system comprising a great number of arithmetic processors, and more particularly, to a clock controlling unit for controlling supply of a clock signal in the computer system to the arithmetic processors.

A computer system generally comprises first through K-th arithmetic processors, where K represents a positive integer which is not less than two. The computer system further comprises a control section and a clock generator section. The control section has a plurality of connection ports to which the arithmetic processors are connected. The clock generator section generates a clock signal to supply the clock signal to the arithmetic processors and the control section so as to put the computer system into operation.

The control section controls the arithmetic processors so that the arithmetic processors can individually access a main memory unit which is connected to the control section. The arithmetic processors carry out communication with one another under the control of the control section.

A conventional clock generator section comprises a clock controlling unit for controlling supply of the clock signal to the arithmetic processors. It will be assumed that a fault occurs in a k-th arithmetic processor, where k represents one of 1 through K. The k-th arithmetic processor generates a fault signal to supply the clock controlling unit with the fault signal. The clock controlling unit stops supply of the clock signal to the k-th arithmetic processor in response to the fault signal. As a result, the k-th arithmetic processor is put out of operation.

The control section has the connection ports of a predetermined number. When the computer system comprises a great number of arithmetic processors in the case of a super computer system, namely, when the number of the arithmetic processors is greater than the predetermined number, it is impossible to connect the arithmetic processors to the connection ports of the control section, respectively.

In order to increase the number of the arithmetic processors which are connected to the connection ports, it is desirable to connect the first through the K-th arithmetic processors in series to one of the connection ports. The first arithmetic processor is directly connected to the one connection port as a nearest arithmetic processor. The K-th arithmetic processor is located as a farthest arithmetic processor relative to the control section. In case where the arithmetic processors are connected in series, the clock controlling unit must stop supply of the clock signal not only to the k-th arithmetic processor but also to the (k+1)-th through the K-th arithmetic processors. This is because the k-th through the K-th arithmetic processors must be put out of operation when a fault occurs in the k-th arithmetic processor.

However, the clock controlling unit of the conventional clock generator section can not stop supply of the clock signal to the (k+1)-th through the K-th arithmetic processors when supply of the clock signal to the k-th arithmetic processor is stopped. This means that the first through the K-th arithmetic processors can not be connected in series to one of the connection ports when use is made of the clock controlling unit of the conventional clock generator section. Therefore, it is difficult to increase the number of the arithmetic processors as desired.

SUMMARY OF THE INVENTION

It is therefore an object of the present invention to provide a clock controlling unit which is capable of controlling supply of a clock signal in a computer system to a plurality of arithmetic processors connected in series to a control section.

It is another object of this invention to provide a clock controlling unit of the type described, which makes it readily possible to increase the arithmetic processors in number as desired.

Other objects of the invention will become clear as the description proceeds.

A computer system to which this invention is applicable comprises first through K-th arithmetic processors, where K represents a positive integer which is not less than two, a control section connected to the arithmetic processors for controlling the arithmetic processors, and generating means for generating a clock signal for the arithmetic processors. Each of the arithmetic processors generates a fault signal when a fault occurs. According to this invention, the first through the K-th arithmetic processors are connected in series to the control section in an ascending order of the first through the K-th arithmetic processors. The generating means comprises a clock oscillator for generating the clock signal, memorizing means for memorizing first and second information, supplying means connected to the first through K-th arithmetic processors and to the clock oscillator for supplying the clock signal to the first through the K-th arithmetic processors, control means connected to the supplying means for controlling, upon production of the fault signal by a k-th arithmetic processor of the first through the K-th arithmetic processors, the supplying means to stop supply of the clock signal to the k-th arithmetic processor through the K-th arithmetic processor when the first information is memorized in the memorizing means, where k represents one of 1 through K. Furthermore, the control means controls the supplying means, when the second information is memorized in the memorizing means, to stop supply of the clock signal to the first through the K-th arithmetic processors even upon production of the fault signal by any one of the first through the K-th arithmetic processors.

A computer system to which this invention is applicable comprises a first group of first through K-th arithmetic processors and a second group of at least one arithmetic processor, where K represents a positive integer which is not less than two, a control section connected to the first through the K-th and the above-mentioned at least one arithmetic processors for controlling the first through the K-th and the above-mentioned at least one arithmetic processors, and generating means for generating a clock signal for the first through the K-th and the above-mentioned at least one arithmetic processors. Each of the first through the K-th and the above-mentioned at least one arithmetic processors generates a fault signal when a fault occurs. According to this invention, the first and the K-th arithmetic processors are connected in series to the control section in an ascending order of the first through the K-th arithmetic processors. The generating means comprises a clock oscillator for generating the clock signal, memorizing means for memorizing first and second information, supplying means connected to the first through the K-th and the above-mentioned at least one arithmetic processors and the clock oscillator for supplying the clock signal to the first through the K-th and the above-mentioned at least one arithmetic processors, control means connected to the supplying means for controlling, upon production of the fault signal by a k-th arithmetic processor of said first group, the supplying means to stop supply of the clock signal to the first through the K-th arithmetic processors when the first information is memorized in the memorizing means, where k represents one of 1 through K. In addition, the control means controls, upon production of the fault signal by an arithmetic processor of the second group, the supplying means to stop supply of the clock signal to the above-mentioned at least one arithmetic processor when the first information is memorized in the memorizing means. Furthermore, the control means controls said supplying means, when the second information is memorized in the memorizing means, to stop supply of the clock signal to the first through the K-th arithmetic processors and the above-mentioned at least one arithmetic processors even upon production of the fault signal by any one of the first through the K-th and the above-mentioned at least one arithmetic processors.

DESCRIPTION OF THE PREFERRED EMBODIMENT

Figure 1:
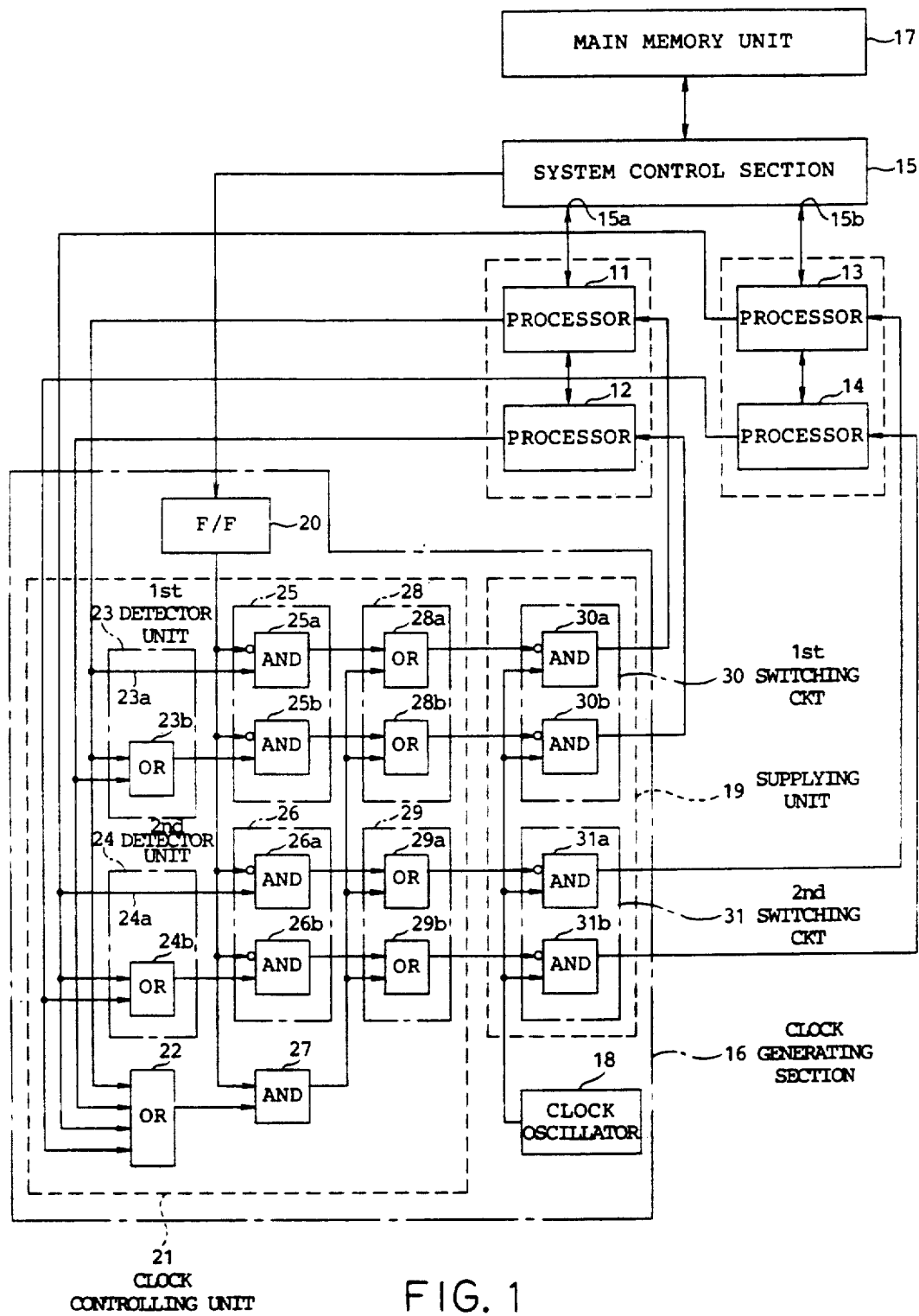
FIG. 1 is a block diagram of a clock controlling unit according to an embodiment of this invention.

Referring to FIG. 1, a computer system comprises first through K-th arithmetic processors, where K represents a positive integer which is not less than two. The computer system may further comprise at least one arithmetic processor. The first through the K-th arithmetic processors are grouped into a first group as first through K-th primary arithmetic processors. The above-mentioned at least one arithmetic processor is grouped into a second group and may be first through J-th secondary arithmetic processors, where J represents a positive integer which is not less than two.

The first through the K-th primary arithmetic processors are connected to a system control section in an ascending order of 1 to K. The first through the J-th secondary arithmetic processors are connected to the control section in an ascending order of 1 to J.

In the illustrated example, each of the positive integers K and J is equal to two. The first and the second primary arithmetic processors are depicted at 11 and 12 and labelled merely "processor". The second group consists of first and second secondary arithmetic processors 13 and 14. The computer system further comprises the system control section indicated at 15 and a clock generating section 16. The system control section 15 has first and second connection ports 15a and 15b to which the first and the second processor groups are connected, respectively.

The clock generating section 16 is connected to the first and the second primary arithmetic processors 11 and 12 and the first and the second secondary arithmetic processors 13 and 14. The first and the second primary arithmetic processors 11 and 12 and the first and the second secondary arithmetic processors 13 and 14 are put into operation by a clock signal which is supplied from the clock generating section 16. Each of the arithmetic processors 11 to 14 generates a fault signal when a fault occurs.

The system control section 15 controls the arithmetic processors 11 to 14 so that the arithmetic processors 11 to 14 individually access a main memory unit 17 connected to the system control section 15. The arithmetic processors 11 to 14 carry out communication with one another under the control of the system control section 15.

The clock generating unit 16 comprises a clock oscillator 18, a supplying unit 19, a flipflop (F/F) 20, and a clock controlling unit 21. The clock oscillator 18 is connected to the supplying unit 19 which is connected, in turn, to the arithmetic processors 11 to 14. The clock controlling unit 21 is connected to the arithmetic processors 11 to 14, the supplying unit 19, and the flipflop 20. The flipflop 20 is for memorizing first and second information signals of a logic zero and a logic one bit, respectively. The clock controlling unit 21 controls the supplying unit 19 by the fault signal of each of the arithmetic processors 11 to 14 when the flipflop 20 memorizes the first and the second information signals. As a result, the supplying unit 19 selectively supplies the clock signal to the arithmetic processors 11 to 14 in the manner which will later be described.

The computer system is operable in one of first and second operation modes at a time. One of the first and the second operation modes is selected upon start of the computer system.

In the first operation mode, the system control section 15 generates the first information signal to store the first information signal in the flipflop 20. The arithmetic processors 11 to 14 individually carry out an arithmetic operation in the computer system.

In the second operation mode, the system control section 15 generates the second information signal to supply the second information signal to the flipflop 20. Each of the arithmetic processors 11 to 14 carries out an arithmetic operation.

The clock controlling section 21 comprises a four-input OR gate 22 connected to the arithmetic processors 11 to 14, a first detector unit 23 connected to the first and the second primary arithmetic processors 11 and 12, and a second detector unit 24 connected to the first and the second secondary arithmetic processors 13 and 14. The first and the second detector units 23 and 24 are connected to first and second AND circuits 25 and 26, respectively, and are connected to the flipflop 20. The OR gate 22 is connected to an AND gate 27. The AND gate 27 is connected to the flipflop 20. The first and the second AND circuits 25 and 26 are connected to first and second OR circuits 28 and 29, respectively. The first and the second OR circuits 28 and 29 are connected to the AND gate 27 and the supplying unit 19.

The first detector unit 23 comprises a signal line 23a and an OR gate 23b. The signal line 23a is connected to the first primary arithmetic processor 11. The OR gate 23b is connected to the first and the second primary arithmetic processors 11 and 12. The first AND circuit 25 comprises AND gates 25a and 25b, which are inhibit gates. The AND gate 25a is connected to the flipflop 20 and the signal line 23a. The AND gate 25b is connected to the flipflop 20 and the OR gate 23b. The first OR circuit 28 comprises OR gates 28a and 28b. The OR gate 28a is connected to the AND gate 25a and the AND gate 27. The OR gate 28b is connected to the AND gate 25b and the AND gate 27.

The second detector unit 24 comprises a signal line 24a and an OR gate 24b. The signal line 24a is connected to the first secondary arithmetic processor 13. The OR gate 24b is connected to the first and the second secondary arithmetic processors 13 and 14. The second AND circuit 26 comprises AND gates 26a and 26b, which are inhibit gates. The AND gate 26a is connected to the flipflop 20 and the signal line 24a. The AND gate 26b is connected to the flipflop 20 and the OR gate 24b. The second OR circuit 29 comprises OR gates 29a and 29b. The OR gate 29a is connected to the AND gate 26a and the AND gate 27. The OR gate 29b is connected to the AND gate 26b and the AND gate 27.

The supplying unit 19 comprises first and second switching circuits 30 and 31. The first switching circuit 30 comprises AND gates 30a and 30b, which are inhibit gates. The AND gate 30a is connected to the clock oscillator 18 and the OR gate 28a. The AND gate 30b is connected to the clock oscillator 18 and the OR gate 28b. The AND gates 30a and 30b are connected to the first and the second primary arithmetic processors 11 and 12, respectively.

The second switching circuit 31 comprises AND gates 31a and 31b, which are inhibit gates. The AND gate 31a is connected to the clock oscillator 18 and the OR gate 29a. The AND gate 31b is connected to the clock oscillator 18 and the OR gate 29b. The AND gates 31a and 31b are connected to the first and the second secondary arithmetic processors 13 and 14, respectively.

When the computer system operates in the first operation mode, the first information signal is set in the flipflop 20. The flipflop 20 outputs a low level signal representative of logic zero. When a fault occurs in the first primary arithmetic processor 11, the first primary arithmetic processor 11 generates a fault signal. The fault signal is supplied to the OR gate 22 and the first detector unit 23.

The OR gate 22 produces an OR'ed signal of logic one as a first gate signal in response to the fault signal. In the first detector unit 23, the fault signal is directly outputted as a first detection signal through the signal line 23a. The OR gate 23b produces an OR'ed signal of logic one as a second detection signal in response to the fault signal.

The first detection signal is supplied to the AND gate 25a. The second detection signal is supplied to the AND gate 25b. The AND gates 25a and 25b use the low level signal as a high level signal and produce AND'ed signals of logic one as first and second command signals, respectively. On the other hand, the AND gate 27 outputs an AND'ed signal of logic zero since the low level signal is supplied from the flipflop 20.

The first and the second command signals are supplied to the OR gates 28a and 28b, respectively. The OR gate 28a produces an OR'ed signal of logic one as a first control signal. The OR gate 28b produces an OR'ed signal of logic one as a second control signal. The first and the second control signals are supplied to the AND gates 30a and 30b, respectively. The AND gates 30a and 30b use the first and the second control signals as a low level signal, respectively. The AND gate 30a stops supply of the clock signal to the first primary arithmetic processor 11. The first primary arithmetic processor 11 is put out of operation. The AND gate 30b stops supply of the clock signal to the second primary arithmetic processor 12. The second primary arithmetic processor 12 is put out of operation.

When the second primary arithmetic processor 12 generates a fault signal in the first mode, only the OR gate 28b produces the second control signal. Therefore, the AND gate 30b stops supply of the clock signal to the second primary arithmetic processor 12.

When the second information signal is set in the flipflop 20, the flipflop 20 outputs a high level signal representative of logic one. The OR gate 22 produces an OR'ed signal of logic one as the first gate signal even when the fault signal is produced by whichever of the first and the second primary arithmetic processors 11 and 12. Therefore, the AND gate 27 produces an AND'ed signal of logic one as a second gate signal. As a result, the OR gates 28a and 28b produce OR'ed signals of logic one as the first and the second control signals, respectively. The OR gates 29a and 29b produce OR'ed signals of logic one as the first and the second additional control signals, respectively.

As described above, the first and the second control signals are supplied to the AND gates 30a and 30b, respectively. The first and the second additional control signals are supplied to the AND gates 31a and 31b, respectively. Accordingly, the AND gates 30a and 30b stop supply of the clock signal to the first and the second primary arithmetic processors 11 and 12, respectively. The AND gates 31a and 31b stop supply of the clock signal to the first and the second secondary arithmetic processors 13 and 14, respectively. Therefore, the first and the second primary arithmetic processors 11 and 12 and the first and the second secondary arithmetic processors 13 and 14 are put out of operation.

In a similar manner, the second switching circuit 31 stops supply of the clock signal to the first and the second secondary arithmetic processors 13 and 14 when the first secondary arithmetic processor 13 generates a fault signal and furthermore when the first information signal is set in the flipflop 20. The second switching circuit 31 stops supply of the clock signal to the second secondary arithmetic processor 14 when the second secondary arithmetic processor 14 generates a fault signal and furthermore when the first information signal is set in the flipflop 20.

Furthermore, the supplying unit 19 stops supply of the clock signal to the first and the second primary arithmetic processors 11 and 12 and the first and the second secondary arithmetic processors 13 and 14 even when the fault signal is produced by whichever of the first and the second secondary arithmetic processors 13 and 14 if the second information signal is set in the flipflop 20.

Reviewing FIG. 1, a combination of the OR gate circuit 22, the first detector unit 23, the first AND circuit 25, the AND gate circuit 27, and the first OR circuit 28 serves as a control arrangement when the computer system comprises the arithmetic processors of the first group alone. When the computer system further comprises the arithmetic processors of the second group, the control arrangement further comprises the second detector unit 24, the second AND circuit 26, and the second OR circuit 29. When the second group consists of only one arithmetic processor, a combination of the second AND circuit 26 and the second OR circuit 29 is operable as an additional producing arrangement. When the second group consists of a plurality of arithmetic processors, the additional producing arrangement comprises the second detector unit 24.

In case where the first group consists of the first through the K-th primary arithmetic processors and where the computer system comprises no second group of the arithmetic processors, the first detector unit 23 comprises the signal line 23a and first through (K−1)-th OR gates. The signal line 23a is connected to the first primary arithmetic processor. The first OR gate is connected to the first and the second primary arithmetic processors. In general, the (k−1)-th OR gate is connected to the first through the k-th primary arithmetic processors, where k represents one of 1 through K. The OR gate 22 is a K-input OR gate which is connected to the first through the K-th primary arithmetic processors.

The first AND circuit 25 comprises first through K-th AND gates which are inhibit gates. The first AND gate is connected to the first primary arithmetic processor through the signal line 23a and is connected to the flipflop 20. The second through the K-th AND gates are connected to the first through the (K−1)-th OR gates, respectively, and are connected to the flipflop 20. The first OR circuit 28 comprises first through K-th OR gates. The first through K-th OR gates are connected to the first through the K-th AND gates, respectively, and to the AND gate 27.

The first switching circuit 30 comprises first through the K-th AND gates which are inhibit gates. The first through the K-th AND gates are connected to the first through the K-th OR gates, respectively. The first through the K-th AND gates are connected to the first through the K-th primary arithmetic processors, respectively, and to the clock oscillator 18.

In case where the computer system further comprises the second group of the first through the J-th secondary arithmetic processors, the OR gate 22 is a (K+J)-input OR gate which is connected to the first through K-th primary arithmetic processors and the first through J-th secondary arithmetic processors. It will be readily understood from the above description how the second detector unit 24, the second AND circuit 26, the second OR circuit 29, and the second switching circuit 31 are constructed.

What is claimed is:

1. In a computer system, comprising:
   first through K-th arithmetic processors, where K represents a positive integer which is not less than two, each of said arithmetic processors generating a fault signal when a fault occurs;
   a control section for controlling said arithmetic processors; and
   generating means for generating a clock signal for each of said arithmetic processors,
   wherein said first through said K-th arithmetic processors are successively connected to one another in series in an ascending order from the first to the K-th arithmetic processors such that the first arithmetic processor is connected to said control section; and
   said generating means comprising:
   a clock oscillator for generating said clock signal;
   memorizing means for memorizing first and second information;
   supplying means connected to said first through said K-th arithmetic processors and said clock oscillator for supplying said clock signal to said first through said K-th arithmetic processors;
   control means connected to said supplying means and said first through said K-th arithmetic processors for controlling, upon production of the fault signal by a k-th arithmetic processor of said first through said K-th arithmetic processors, said supplying means to stop supply of said clock signal to said k-th through said K-th arithmetic processors whenever said first information is memorized in said memorizing means, where k represents one of 1 through K, said control means controlling said supplying means, whenever said second information is memorized in said memorizing means, to stop supply of said clock signal to said first through said K-th arithmetic processors even upon production of the fault signal by any of said first through said K-th arithmetic processors.

2. A computer system as claimed in claim 1, wherein said control means comprises:
   first gate means connected to said first through said K-th arithmetic processors for producing a first gate signal when supplied with the fault signal from at least one of said first through said K-th arithmetic processors;
   detector means connected to said first through said K-th arithmetic processors for detecting the fault signal of said k-th arithmetic processor to produce k-th through K-th detection signals;
   second gate means connected to said memorizing means and said first gate means for producing a second gate signal when supplied with said first gate signal and furthermore when said memorizing means memorizes said second information;
   first producing means connected to said memorizing means and said detector means for producing k-th through K-th command signals when supplied with said k-th through said K-th detection signals, respectively, and furthermore when said memorizing means memorizes said first information; and
   second producing means connected to said first producing means, said second gate means, and said supplying means for producing first through K-th control signals in response to said second gate signal to supply said first through said K-th control signals to said supplying means, said second producing means producing k-th through K-th control signals in response to said k-th through said K-th command signals, respectively, to supply said k-th through said K-th control signals to said supplying means;
   said supplying means comprising:
   disconnecting means connected to said clock oscillator, said second producing means, and said first through said K-th arithmetic processors for disconnecting said clock oscillator from said first through said K-th arithmetic processors in response to said first through said K-th control signals, respectively.

3. A computer system as claimed in claim 2, wherein said first information is equal to '0' and said second information is equal to '1'.

4. In a computer system, comprising:
   a first group of first through K-th arithmetic processors and a second group of at least one arithmetic processors, where K represents a positive integer which is not less than two, each of said first through said K-th arithmetic processors and said at least one arithmetic processor generating a fault signal when a fault occurs;

a control section for controlling said first through said K-th arithmetic processors and said at least one arithmetic processor; and generating means for generating a clock signal for said first through said K-th arithmetic processors and said at least one arithmetic processor, wherein said first through said K-th arithmetic processors are successively connected to one another in series in an ascending order from the first to the K-th arithmetic processors such that the first arithmetic processor is connected to said control section;

said generating means comprising:

a clock oscillator for generating said clock signal;

memorizing means for memorizing first and second information;

supplying means connected to said first through said K-th arithmetic processors, said at least one arithmetic processor, and said clock oscillator for supplying said clock signal to said first through said K-th arithmetic processors and said at least one arithmetic processor;

control means connected to said supplying means, said first through said K-th arithmetic processors, and said at least one arithmetic processor for controlling, upon production of the fault signal by a k-th arithmetic processor of said first group, said supplying means to stop supply of said clock signal to said k-th through said k-th arithmetic processors whenever said first information is memorized in said memorizing means, where k represents one of 1 through K, said control means controlling, upon production of the fault signal by an arithmetic processor of said second group, said supplying means to stop supply of said clock signal to said at least one arithmetic processor whenever said first information is memorized in said memorizing means, said control means controlling said supplying means, whenever said second information is memorized in said memorizing means, to stop supply of said clock signal to said first through said K-th arithmetic processors and said at least one arithmetic processor even upon production of the fault signal by any one of said first through said k-th arithmetic processors and said at least one arithmetic processor.

5. A computer system as claimed in claim 4, wherein said control means comprises:

first gate means connected to said first through said K-th and said at least one arithmetic processor for producing a first gate signal when supplied with the fault signal from at least one of said first through said K-th arithmetic processors;

detector means connected to said first through said K-th arithmetic processors for detecting the fault signal of said k-th arithmetic processor to produce k-th through K-th detection signals;

second gate means connected to said memorizing means and said first gate means for producing a second gate signal when supplied with said first gate signal and furthermore when said memorizing means memorizes said second information;

first producing means connected to said memorizing means and said detector means for producing k-th through K-th command signals when supplied with said k-th through said K-th detection signals, respectively, and furthermore when said memorizing means memorizes said first information;

second producing means connected to said first producing means, said second gate means, and said supplying means for producing first through K-th control signals in response to said second gate signal to supply said first through said K-th control signals to said supplying means, said second producing means producing k-th through K-th control signals in response to said k-th through said K-th command signals, respectively, to supply said k-th through said K-th control signals to said supplying means;

additional producing means connected to said second gate means, said memorizing means, and said supplying means for producing an additional control signal either when supplied with said second gate signal or when supplied with the fault signal from said at least one arithmetic processor and furthermore when said memorizing means memorizes said first information, said additional producing means supplying said additional control signal to said supplying means;

said supplying means comprising:

disconnecting means connected to said clock oscillator, said second producing means, and said first through said K-th arithmetic processors for disconnecting said clock oscillator from said first through said K-th arithmetic processors in response to said first through K-th control signal, respectively; and additional disconnecting means connected to said clock oscillator, said additional producing means, and said at least one arithmetic processor for disconnecting said clock oscillator from said at least one arithmetic processor in response to said additional control signal.

6. A computer system as claimed in claim 5, wherein said first information is equal to '0' and said second information is equal to '1'.

* * * * *